United States Patent Office 3,636,164
Patented Jan. 18, 1972

3,636,164
TETRAHYDROXYLIC ORGANO COMPOUNDS AND THE PROCESS FOR PREPARING THE SAME
Andre Lakodey and Francis Weiss, Pierre-Benite, France, assignors to Ugine Kuhlmann, Paris, France
No Drawing. Filed Jan. 22, 1968, Ser. No. 699,290
Claims priority, application France, Jan. 20, 1967, 91,856
Int. Cl. C07c 43/02
U.S. Cl. 260—615 R    5 Claims

ABSTRACT OF THE DISCLOSURE

Tetrahydroxylic organo compounds such as 1-hydroxyethyleneoxy-2 - methylol - 2,6 - hexanediol, 1 - hydroxydiethyleneoxy-2-methylol - 2,6 - hexanediol, 1- hydroxypropyleneoxy-2-methylol-2,6 hexanediol and 1-hydroxydipropyleneoxy-2-methylol-2,6-hexanediol are prepared from their corresponding 1-[hydroxyalkyleneoxymethyl] - 6,8-dioxabicyclo[3.2.1]octanes by hydrolysis and hydrogenation in a non-alkaline medium and in the presence of a hydrogenation catalyst.

FIELD OF THE INVENTION

This invention relates to 1-[hydroxyalkyleneoxy]-2-methylol-2,6-hexanediols and the process for preparing the same.

SUMMARY OF THE INVENTION

1-[hydroxyalkyleneoxy]-2-methylol-2,6 - hexanediol of the formula

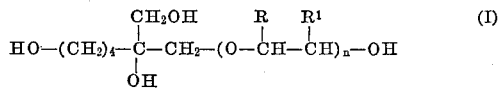

wherein n is an integer between 1 and about 40 and R and R¹ each is a hydrogen atom or a lower alkyl radical containing 1 to 6 carbon atoms is produced by hydrolyzing in the presence of at least a stoichiometric amount of water, a 1-[hydroxyalkyleneoxymethyl]-6,8-dioxabicyclo[3.2.1]octane of the formula

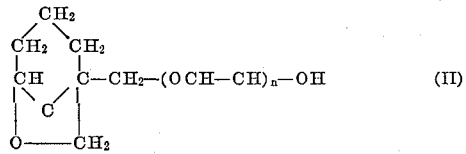

and hydrogenating in a non-alkaline medium, the hydrolysis product in the presence of a hydrogenation catalyst.

The tetrahydroxylic organo compounds of this invention thus prepared are valuable intermediates by virtue of their tetravalent alcoholic structure. They are suitable for the preparation of plasticizing or lubricating agents and in particular, for the manufacture of synthetic resins such as polyesters and polyurethanes.

DESCRIPTION OF THE PREFERRED EMBODIMENT

The actual mechanism for the conversion of 1-[hydroxyalkyleneoxymethyl] - 6,8 - dioxabicyclo[3.2.1]octanes to their corresponding 1-[hydroxyalkyleneoxy]-2-methylol-2,6-hexanediols is not yet certain. It may be hypothesized as to involve a hydrolysis of the bicyclic acetal function in the bicyclooctane followed by hydrogenation of the resulting aldehyde which is not isolated. We found in the actual reaction, at least one molecule of water per molecule of the bicyclooctane is required to complete the conversion.

1-[hydroxyalkyleneoxymethyl-6,8 - dioxabicyclo[3.2.1] octanes suitable as the starting materials for producing tetrahydroxy organo compounds of this invention, may be prepared by reacting, in the presence of an alkaline catalyst or a Lewis acid such as boron trifluoride, an alkylene oxide of the formula

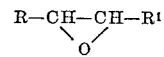

such as ethylene oxide and propylene oxide with 1-methylol 6,8-dioxabicyclo[3.2.1]octane according to the well known addition reaction of alkylene oxides and alcohols. Depending on the reaction conditions, the resultant adduct has the afore-depicted Formula II wherein the integer n may be in the range from 1 to about 40. The preparation of 1-[hydroxyalkyleneoxymethyl]-6,8-dioxabicyclo[3.2.1]octanes is described in greater detail in our French patent application Ser. No. 91,732, filed on Jan. 19, 1967 entitled 'New monohydroxylated polyethers and process for making them", now French Pat. No. 1,515,-213.

The conversion of the bicyclooctanes to the tetrahydroxylic organo compounds of this invention preferably is carried out in an almost neutral reaction medium having a pH in the range of about 5 to 7. It is sometimes advantageous to carry out the reaction in the presence of a small amount of an acid agent which tends to accelerate the conversion process. The acid agents suitable for the reactions may be (a) an inorganic acid such as sulfuric acid, hydrochloric acid or phosphoric acid, (b) an acid salt such as sodium or ammonium bisulfate, or (c) a saturated carboxylic acid having 1 to 4 carbon atoms such as acetic acid, propionic acid, butyric acid or succinic acid. Depending on the acidic strength of the agent used, its amount required for the reaction may vary within a wide range. As a general rule, a range between 0.01 and 3% by weight of the total reaction mixture has been found to be suitable.

Instead of the aforesaid acid agents, cation resins such as sulfonated copolymers of styrene and divinylbenzene, when used in a greater quantity of from 5% to 100% by weight of the reaction mixture, have also been found to be effective for accelerating the reaction.

Because the resultant conversion products, 1-[hydroxyalkyleneoxy]-2-methylol - 2,6 - hexanediols are very viscous compounds, the process of this invention is advantageously carried out in a suitable solvent. The preferred solvents include water in an amount in excess of the requirement for the hydrolysis, and inert solvents such as saturated alcohols containing 1 to 4 carbon atoms, ethers, e.g., dioxane, and their mixtures. The amount of solvent that can be used is not critical. It may reach or even exceed 10 times the amount of tetrahydroxylic organo compound produced.

To catalyze the hydrogenation of the hydrolysis product, conventional hydrogenation catalysts can be used. Among them, we found (a) Raney nickel or cobalt, (b) reduced nickel, cobalt or copper and (c) copper chromite, platinum, palladium, rhodium and ruthenium to be eminently suitable. The catalyst may be deposited on a suitable carrier such as pumice, diatomaceous earth, alumina, silica, and activated carbon. The amount of catalyst required for the process of this invention may vary within a wide range of from 0.1% to 30% by weight of the product depending on the catalytic activity of the catalyst used and other reaction variables.

The conversion reaction is carried out in a liquid phase at a temperature generally in the range of from ambient temperature (about room temperature) to about 250° C. The selection of a suitable temperature is governed somewhat by the catalyst used. As a rule, satisfactory reaction speed is attended with a temperature in the range of 50° C. to 200° C.

The hydrogenation may be performed at normal atmospheric conditions. It is, however, preferable to operate under a hydrogen pressure to accelerate the reaction. The hydrogen pressure that may be used for the reaction may exceed 250 atmospheric pressure. It is advantageous to operate at a pressure in the range of 5 to 170 atmospheres.

After the reaction is substantially complete, the catalyst is first removed by filtration or other suitable means. The clear filtrate is preferably neutralized if an acidic agent is used before the solvent is removed by evaporation. The reaction is substantially quantitative. The reaction product after evaporation of the solvent is colorless and is sufficiently pure for majority of commercial applications. If it is necessary and the molecular weight of the product is not too high, the polyols of this invention may be purified by distillation, preferably under low pressure.

It is interesting to note that ethylene or propylene oxide adducts of polyols such as 1,1,1-trimethylol propane have been prepared heretofore as highly branched polyols wherein the alkylene oxide is positioned indiscriminately with respect to all the alcoholic functions of the starting polyol thus producing resins with modified and different properties. Contrasting with these known products, the polyols of this invention are in the form of monosubstituted derivatives of the starting polyol, 2-methylol-1,2,6-hexanetriol, excluding a more highly substituted products. This fact leads to a more predominantly linear structure in the polyols of this invention each carrying two terminating alcoholic functions and two additional alcoholic functions positioned on and adjacent to the linear structure thereby providing different properties for resins prepared therefrom.

The polyols of this invention, as stated before, are viscous and colorless liquor. They are miscible or very soluble in water. These properties render them suitable as hydroscopic agents, as plasticizers for cellophane, and as an additive for hydraulic fluids for anti-freeze mixtures, for printing inks, for textile finishes, and for pharmaceutical compositions.

Further to illustrate this invention specific examples are described hereinbelow.

EXAMPLE I

Preparation of 1-hydroxyethyleneoxy-2-methylol-2,6-hexanediol

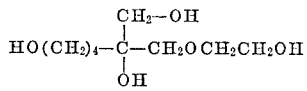

The starting material was 1-[hydroxyethyleneoxymethyl]-6,8-dioxabicyclo[3.2.1]octane, prepared by the addition, in a basic medium, of a molecule of ethylene oxide to 1-methylol-6,8-dioxabicyclo[3.2.1]octane, of which the properties were the following:

B.P.$_{0.1-0.5 \text{ mm. Hg}}$=95°; $n_D^{20}$=1.477; $d_4^{20}$=1.1714

35 grams of this product (0.186 mole) were dissolved in 105 grams of water in an autoclave having therein 1.4 grams of activated carbon containing 5% metallic ruthenium, and hydrogenation was carried out for 4 hours at 125° C. under a hydrogen pressure of 80 bars. The catalyst was then filtered out, the water was eliminated by distillation, and the product was then distilled under a pressure of 0.1 to 0.5 mm. Hg. After having eliminated a head fraction weighing from 1 to 2 grams, made up of untransformed product, there was obtained 33 grams (0.158 mole) of a colorless liquid, very viscous, and miscible in water;

B.P.$_{0.1-0.5}$=180–183° C.; $n_D^{20}$=1.490; $d_D^{20}$=1.1753 which consists of 1-hydroxyethyleneoxy-2-methylol-2,6-hexanediol (5-methylol-3-oxa-1,5,9-nonanetriol) according to chemical analysis by acetylation and infrared spectrometry. The yield with respect to the starting material was 85%.

EXAMPLE II

Preparation of 1-hydroxydiethyleneoxy-2-methylol-2,6-hexanediol

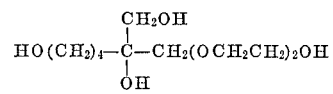

The starting product was the addition product of two molecules of ethylene oxide to one molecule of 1-methylol - 6,8 - dioxabicyclo[3.2.1]octane. The properties of this product were the following:

B.P.$_{0.1-0.5 \text{ mm. Hg}}$=125–135° C.;
$n_D^{20}$=1.4755;
$d_4^{20}$=1.1610

35.4 grams (0.152 mole) of this product were dissolved in 100 grams of water in an autoclave having therein 4 grams of Raney nickel, and hydrogenation was carried out for 4 hours at 150° C. under a hydrogen pressure of 120 bars. The catalyst was then filtered out, the water was evaporated, and the product was then distilled at a pressure of 0.5 to 1 mm. of mercury. There was obtained 36.2 grams (0.144 mole) of a very viscous, colorless liquid having the following properties;

B.P.$_{0.5-1 \text{ mm. Hg}}$=210–215° C.;
$n_D^{20}$=1.4865;
$d_4^{20}$=1.1646, which was 1-hydroxyethyleneoxy - 2 - methylol-2,6-hexanediol (8-methylol - 3,6 - dioxa - 1,8,12 - dodecanetriol). The yield reached 94.5% of the theoretical.

EXAMPLE III

Preparation of 1-hydroxypropyleneoxy-2-methylol-2,6-hexanediol

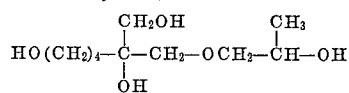

The starting material was the addition product of one molecule of propylene oxide to one molecule of 1-methylol - 6,8 - dioxabicyclo[3.2.1]octane. This product, 1-hydroxypropyleneoxymethyl - 6,8 - dioxabicyclo[3.2.1]octane, was almost exclusively made up of the isomer with the structure of a secondary alcohol; its structure and its properties were the following:

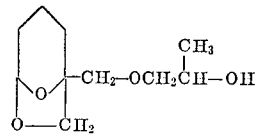

B.P.$_{0.2-0.4 \text{ mm. Hg}}$=95–100° C.;
$n_D^{20}$=1.470;
$d_4^{20}$=1.1232

40.2 grams (0.20 mole) of this product were dissolved in 150 grams of water in an autoclave having therein 2 grams of activated carbon containing 5% metallic ruthenium, and hydrogenation was carried out for 2 hours at 125° C. under a hydrogen pressure of 90 bars. The catalyst was then filtered out, the water was distilled at atmospheric pressure, and then the product was distilled under a pressure of 0.4 to 0.6 mm. Hg. After elimination of approximately 1 gram of the more volatile products, there was collected 42 grams of a colorless viscous liquid, miscible in water and having the following properties B.P.$_{0.4-0.6\text{ mm. Hg}}$=194–195° C.;
$n_D^{20}$=1.484;
$d_4^{20}$=1.1405.

Results of the chemical analysis and of the infrared spectrometry indicated that this product was the desired 1 - hydroxypropyleneoxy - 2 - methylol - 2,6 - hexanediol (6-methylol - 4 - oxa - 2,6,10 - decanetriol). The amount obtained corresponded to 0.171 mole, that is to say, 94% of the theoretical yield with respect to the starting material.

EXAMPLE IV

Preparation of 1-hydroxy(dipropyleneoxy)-2-methylol-2,6-hexanediol

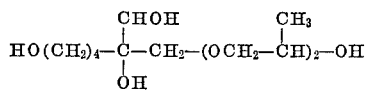

The starting material was the addition product of two molecules of propylene oxide to one molecule of 1-methylol - 6,8 - dioxabicyclo[3.2.1]octane. Infrared analysis showed that, like its lower homolog used in the preceding example, this product was mainly made up of the isomer with the structure of a secondary alcohol

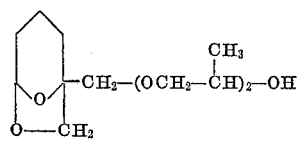

Its properties were the following:

B.P.$_{0.3\text{ mm. Hg}}$=121° C.;
$n_D^{20}$=1.466;
$d_4^{20}$=1.0975.

39 grams (0.15 mole) of this product were dissolved in 150 grams of water having therein 2 grams of activated carbon containing 5% metallic ruthenium, in an autoclave, and hydrogenation was carried out for 2 hours at 125° C. under a hydrogen pressure from 85 to 100 bars. The catalyst was then filtered out, the water was distilled at atmospheric pressure, and then the product was distilled at a reduced pressure of 0.1 to 0.3 mm. Hg. After elimination of about 1 gram of light products, there was collected 39 grams (0.14 mole) of 1-hydroxy(dipropyleneoxy) 2-methylol - 2,6 - hexanediol (5-methyl-9-methylol - 4,7 - dioxa - 2,9,13 - tridecanetriol), in the form of a colorless liquid, quite viscous and miscible in water, of which the properties were:

B.P.$_{0.1-0.3\text{ mm. Hg}}$=179–180° C.;
$n_D^{20}$=1.478;
$d_4^{20}$=1.1096.

The chemical analysis and the infrared spectrum were in agreement with the structure. The yield was 93%. The following examples describe the preparation of some starting materials:

EXAMPLE V 217.5 g. of 1-methylol-6,8 dioxabicyclo[3.2.1]octane, 88 g. ethyleneoxide and 12 g. of an aqueous solution containing 40%, by weight, of benzyltrimethylammonium hydroxide, were heated during five hours at 60° C., then during three hours at 100° C., in a pressure vessel, under a nitrogen pressure of 20 bars. Then the mixture was dissolved in 800 g. of water and neutralized by contacting the solution with 60 g. of "Dowex 50," a cationic resin sold by the Dow Chemical Company. The solvent was evaporated and the products were distilled at a pressure of about 0.5 mm. Hg. A main fraction, weighing 196 g. and boiling at 93–160° C., was recovered, and was found by analysis by vapour phase chromatography to consist in 47.5 weight percent of the mono-oxyethylated product ($n$=1), and 52.5% of di-oxyethylated product ($n$=2). By further fractionation of this mixture pure mono- and di-oxyethylated compounds were obtained

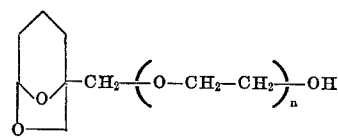

EXAMPLE VI 217.5 g. of 1-methylol-6,8 dioxa bicyclo[3.2.1] octane, 130 g. propylene oxide and 12 g. of an aqueous solution containing 40 weight-percent of benzyltrimethylammonium hydroxide, were heated during 6 hours at 80° C., under a nitrogen pressure of 20 bars. The catalyst was then neutralized by adding 2.5 g. acetic acid, and the mixture was rectified first at a pressure of 20 mm. Hg, to distil unreacted propylene oxide, and the water, then at a pressure of about 0.4 mm. Hg, to distill bicyclo compounds. A main fraction, 218 g., collected between 95 and 100° C. boiling temperature, consisted of substantially pure monoaddition product ($n$=1). The next fraction, 23 g., boiling from 101 to 121° C., was a mixture of 20% mono- and 80% di-addition products; the last fraction, 62 g., was a substantially pure di-addition product ($n$=2), boiling at 121° C.

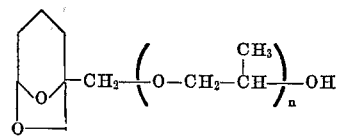

We claim:
1. 1 - (hydroxyalkyleneoxy)-2-methylol-2,6-hexanediol of the formula

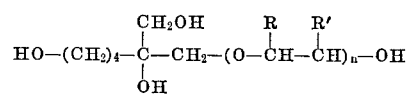

wherein $n$ is an integer between 1 and about 40 and R and R' each is a hydrogen atom or an alkyl radical containing 1 to 6 carbon atoms.

2. A compound according to claim 1 wherein its formula is

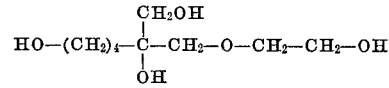

3. A compound according to claim 1 wherein its formula is

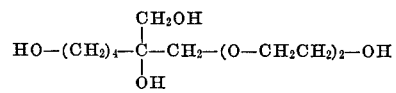

4. A compound according to claim 1 wherein its formula is

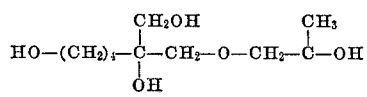

5. A compound according to claim 1 wherein its formula is
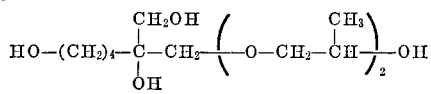
References Cited
UNITED STATES PATENTS
| | | | |
|---|---|---|---|
| 2,122,813 | 7/1938 | Groll et al. | 260—615 UX |
| 2,486,024 | 10/1949 | Hearne et al. | 260—615 |
| 2,546,019 | 3/1951 | Smith | 260—615 UX |
| 2,888,492 | 5/1959 | Fischer et al. | 260—615 UX |
FOREIGN PATENTS
| | | | |
|---|---|---|---|
| 727,625 | 2/1966 | Canada | 260—61 J |
| 1,020,500 | 2/1966 | Great Britain | 260—615 |
OTHER REFERENCES
Howard et al., J. Org. Chem., 26 (1961), pp. 1026–1028.
Arundale et al., Chem. Reviews, 51 (1952), pp. 526–527.
Sussman, Ind. & Eng. Chem., 38 (1946), pp. 1228–1230.
HOWARD MARS, Primary Examiner
U.S. Cl. X.R.
106—20, 188; 252—8.19, 70, 71, 73, 194; 260—77.5 AN, 615 B

PO-1050
(5/69)

UNITED STATES PATENT OFFICE
CERTIFICATE OF CORRECTION

Patent No. 3,636,164      Dated  January 18, 1972

Inventor(s) ANDRE LAKODEY and FRANCIS WEISS

It is certified that error appears in the above-identified patent and that said Letters Patent are hereby corrected as shown below:

Column 1, lines 43 to 49 should read:

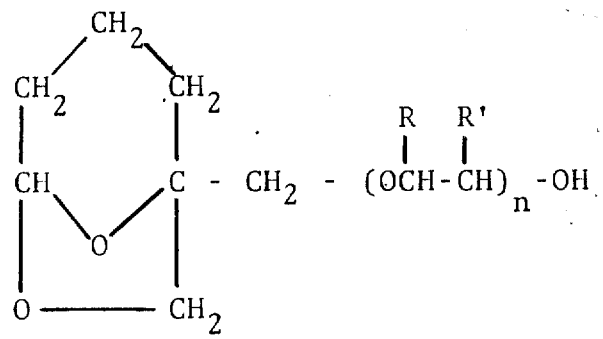

Claim 4, Column 6, lines 73 to 75 should read:

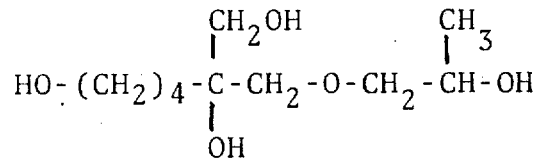

Signed and sealed this 13th day of June 1972.

(SEAL)
Attest:

EDWARD M. FLETCHER, JR.
Attesting Officer

ROBERT GOTTSCHALK
Commissioner of Patents